Jan. 3, 1961  R. S. MORRIS  2,966,985
SPECTACLE CASES
Filed Jan. 21, 1959
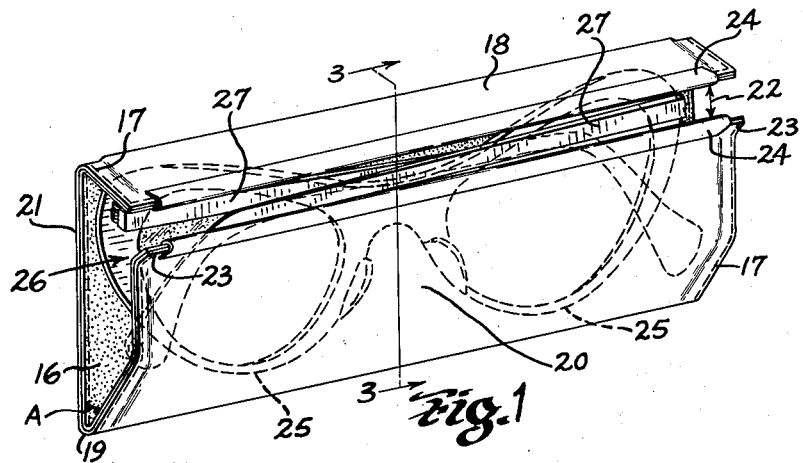
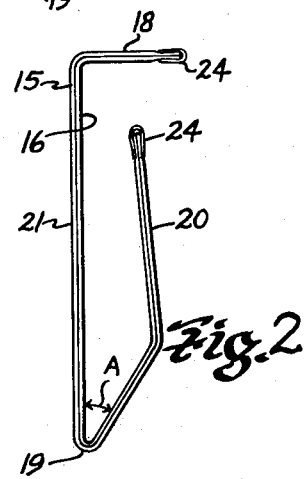
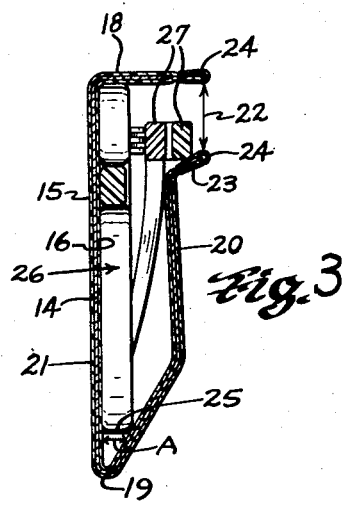
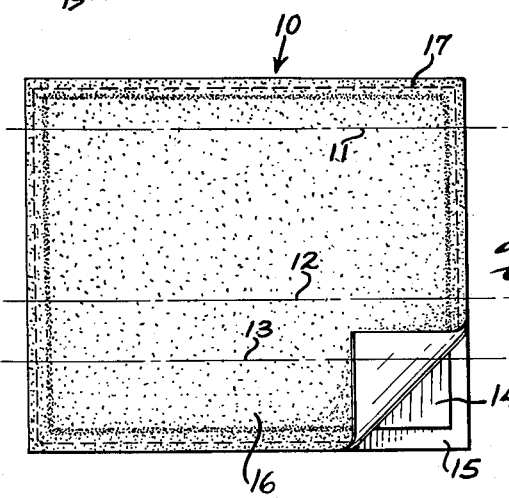
INVENTOR
ROBERT S. MORRIS
BY
*Louis L. Gagnon*
ATTORNEY

United States Patent Office 2,966,985
Patented Jan. 3, 1961

2,966,985

SPECTACLE CASES

Robert S. Morris, Southbridge, Mass., assignor to American Optical Company, Southbridge, Mass., a voluntary association of Massachusetts Filed Jan. 21, 1959, Ser. No. 788,103

3 Claims. (Cl. 206—5)

This invention relates to improvements in cases and has particular reference to protective cases for spectacle frames or the like and method of making the same.

The principal object of the invention is to provide an inexpensive compact and light weight open-ended sepectacle case which is adapted to receive and securely hold ophthalmic mountings of all conventional sizes and shapes and method of making the same.

Another object is to provide an open-ended spectacle case designed to grip and securely hold an ophthalmic mounting under tension when placed therein without altering or in any way distorting the face form or fitting characteristics of the mounting.

Another object is to provide a spring-tensioned spectacle case which, in addition to being open at each of its ends, is provided with a longitudinal opening along one of its sides to permit quick and easy insertion of a spectacle frame to be supported therein.

Another object is to provide a spectacle case of the above character which is adapted to produce a gripping force on a spectacle frame or the like when placed therein throughout the major portion of said frame to prevent accidental displacement thereof while, at the same time, relieving pressure on the elongated side portions of the temple parts of said frame to prevent distortion of the face form shape characteristics of said temple parts by the gripping forces of said case.

A further object is to provide a one-piece open-ended spectacle case which is pleasing in appearance, extremely economical to manufacture, compact, light in weight and highly efficient in use.

Other objects and advantages of the invention will become apparent from the following description when taken in conjunction with the accompanying drawings in which:

Fig. 1 is a front perspective view of the spectacle case of the invention showing a conventional ophthalmic mounting in position of use therein;

Fig. 2 is an end view of the case of Fig. 1 without an ophthalmic mounting therein;

Fig. 3 is a vertical cross-sectional view taken substantially on line 3—3 of Fig. 1; and Fig. 4 is a reduced plan view of the case assembly prior to its being formed to its final shape and having the material at one of its corners turned back to partially expose its inner construction.

In general, most known conventional open-ended spectacle cases in the past have not provided secure means for holding spectacle frames or ophthalmic mountings and oftentimes mountings have become damaged by being accidentally displaced from the cases. In an attempt to overcome this drawback to open-ended cases, various gripping arrangements such as elastic bands or flat spring inserts or the like have been incorporated in the cases to clamp the mountings in place. Such gripping arrangements, however, have been deleterious to the mountings in that the force required to hold the mountings securely in the cases has been such as to bend certain of the parts thereof such, for example, as the more delicate temple parts of the mountings which have been initially carefully adjusted to the required face-fitting shape.

The present invention offers the distinct advantage of providing an attractive open-ended spectacle case which is extremely economical to manufacture and which is adapted to firmly and securely grip a spectacle frame or the like when positioned therein to provide positive means for preventing accidental displacement of the frame and without distortion or otherwise destroying the initially adjusted face-form shape characteristics of the frame.

Referring more particularly to the drawings wherein like characters of reference designate like parts throughout the various views thereof, it will be seen that the spectacle case of the invention is composed broadly of an initially flat single substantially rectangular structure 10 (see Fig. 4) which is ultimately formed to the desired shape illustrated in Figs. 1 and 2 by bending the structure 10 substantially at three predetermined locations designated by the dot-dash lines 11, 12 and 13.

The structure 10 of Fig. 4 embodies a rectangular relatively thin sheet-like stiffening member 14 preferably formed of a resilient metal such as cold rolled steel or the like which is interposed between a slightly larger rectangular sheet-like piece of relatively limp covering material 15 and a slightly larger rectangular sheet-like piece of relatively limp lining material 16 of a similar size as the piece 15, the said materials being of a fabric, plastic, leather, or any of the commonly used case-covering and lining materials. It is pointed out that the stiffening member 14 may, if desired, be formed of thin plastic sheet material which is resilient in nature and formable as by heating and bending substantially along the lines 11, 12 and 13 to produce the desired case shape shown in Figs. 1 and 2. Moreover, the pieces of covering and lining materials 15 and 16 respectively can be of any selected combination of colors and surface textures to provide a finished case which is pleasing in appearance and the piece 16 which ultimately becomes the inner lining of the finished spectacle case is preferably of a soft or plush texture so as to prevent scratching of the lenses of ophthalmic mountings which are to be placed in the finally formed case.

With the parts 14, 15 and 16 of the structure 10 assembled together, the overlapping edges of the pieces 15 and 16 are joined as by stitchings 17, cementing or by heat-sealing in instances where both pieces 15 and 16 are of fusible materials such as plastics.

In this manner, an integral structure 10 is formed. To produce the case, a narrow portion of the top of the integral structure 10 is bent approximately 90° relative to the central area thereof substantially along line 11 to form the top part 18 in overhanging relation with the back part 21 of the finished case (see Figs. 1, 2 and 3). A second bend is made substantially along line 12 to direct a substantial portion of the lower part of the structure 10 upwardly to form a forward wall 20 which is angled to be in diverging relation with the back 21 of the case. This latter bend is about a relatively short radius which forms the closed bottom edge of the case, as indicated at 19. A third slightly inward bend is made substantially along the line 13 to direct the upper portion of the forward wall 20 of the case slightly inwardly in converging relation with the rear wall 21 (see Fig. 2). The top part 18 and forward wall 20 of the case are so dimensioned as to have their free edges disposed in spaced substantially parallel relation with each other, with said space being such as to allow exposure of the sides of the temples of an ophthalmic mounting when placed in said case.

The bend along the line 12 (Fig. 4) which forms the closed bottom 19 of the spectacle case is controlled to produce a downwardly tapering pocket portion within the finished spectacle case which is of such an angle A (Fig. 2), controlled in accordance with the height of the rear wall 21 of the case, as to receive the lowermost rim parts 25 of an ophthalmic mounting such as 26 and urge said mounting upwardly to a position wherein the top of the rim parts will bear against the top part 18 of the case. This is due to the taper of the pocket and the resiliency of the stiffening member 14, which thereby produce a slight tensioning or gripping force on the top and bottom portions of the rim parts of the mounting 26 to assist in holding said mounting in place within the case (see Fig. 3). In addition to the gripping force produced on the mounting in the above-described manner, the upper portion of the front wall 20 of the case which is initially formed to incline or slightly converge inwardly toward the rear wall 21 thereof (see Fig. 2), is expanded slightly outwardly when a mounting 26 is placed in the case (see Fig. 3). Again, the resiliency of the stiffening member 14 will tend to urge the front part 20 back to its initial set position, shown in Fig. 2, and thereby produce a gripping force on the sides of the mounting by urging the mounting tightly against the rear wall 21 of the case.

The gripping force at the top and bottom of the mounting 26 along with the gripping force at the sides of the mounting provide a secure clamping effect which positively prevents the mounting 26 from becoming accidentally displaced from the case. By combining these forces as described above, it is possible to securely hold the mounting 26 in the case without crushing the same or altering its face-form shape characteristics.

In order to assure that the more delicate side portions of the temple parts 27 of the mounting are not deformed by the gripping forces of the top and side parts of the case, a longitudinal opening 22 resulting from the spaced relation of the free edges of the part 18 and forward wall 20 is provided across the front of the case as shown in Figs. 1, 2 and 3 to expose the elongated side portions of the temple parts 27 of the mounting. In this manner, the uppermost edge of the front 20 of the case engages the mounting below the elongated side portions of the temple parts and no pressure is exerted on the major portions of the sides of said temple parts.

While the major portion of the temple parts of the ophthalmic mounting are exposed when the mounting is placed within the case, as shown in the drawings, it will be seen in Figs. 1 and 3 that the outwardly protruding edge portions of the covering and lining materials 15 and 16 of the front part 20 of the case adjacent the temple parts of the mounting becomes rolled outwardly away from the inner stiffening member 14 by said temple parts and projects forwardly and outwardly slightly beyond the plane of the exposed portion of the temples to provide a protective lip 23 which along with the forwardly projecting edge of the top part 18 of the case protects the side parts of the temples from being crushed or otherwise damaged when the spectacle case is in use.

As an added protection for the exposed portions of the temple parts of the mounting, elongated channelled stiffening members 24 of metal or plastic are crimped or otherwise fastened to the covering and lining materials 15 and 16 along the protruding edges thereof which form the elongated lateral opening 22. The members 24 further serve to decorate the case and thereby enhance its aesthetic value.

It is further pointed out that by providing the open-ended case of the invention with the longitudinal opening 22, ophthalmic mountings may be quickly and easily slipped endwise into the case and securely held therein without damaging or in any way altering the adjusted face-form characteristics of the mountings.

From the foregoing, it can be seen that simple, efficient and economical means and method have been provided for accomplishing all of the objects and advantages of the invention as expressed in the accompanying claims. However, the invention is not limited to the exact matters shown and described as only the preferred matters have been given by way of illustration.

Having described my invention, I claim:

1. A spectacle case of the character described comprising a body part formed of an initially flat relatively thin member of resilient shape-retaining material interposed between a pair of sheet-like members of relatively limp material having overlapping edge portions, said overlapping portions of said covering members being secured together, said body part being formed as by bending to provide an open-ended structure embodying a continuous relatively flat back section, a relatively narrow top section extending forwardly from said back section and having a forwardly directed free edge, a front section spaced from said back section and extending upwardly from the lower edge of said back section towards said top section and having a free edge terminating in spaced substantially parallel relation with said free edge of said top section to provide a longitudinal opening between said top and front sections across said case between its open opposite ends and elongated rigid strip-like reinforcing members secured to the overlapped portions of said relatively limp materials along each of said free edges of said respective top and front sections.

2. A spectacle case formed of an initially flat sheet-like member of resilient shape-retaining material comprising a substantially flat rectangularly shaped back section, a relatively narrow top section angled to one side of the adjacent edge of said back section in a direction substantially normal to the plane of said back section and terminating with a relatively straight free edge, a front section extending upwardly from the opposite edge of said back section generally towards said top section and terminating in a relatively straight free edge spaced from said free edge of said top section and substantially parallel thereto to provide a longitudinal opening between said top and front sections which extends completely across said case, a substantial portion of said front section adjacent said opposite edge of said back section being formed to incline upwardly and outwardly away from the plane of said back section and the remaining portion of said front section adjacent its free edge being formed to incline oppositely to said first-mentioned portion slightly towards said back section.

3. A spectacle case of the character described comprising a body part formed of an initially flat relatively thin member of resilient shape-retaining material interposed between a pair of sheet-like members of relatively limp material having overlapping edge portions, said overlapping portions of said covering members being secured together, said body part being formed by bending to provide an open-ended structure embodying a continuous relatively flat back section, a relatively narrow top section extending forwardly of said back section and having a forwardly directed free edge, said overlapping portions of said covering members along said free edge extending outwardly of said edge and being free to move with a hinge-like action relative thereto, a front section spaced from said back section and extending upwardly from the lower edge of said back section towards said top section and having an upper free edge terminating in spaced substantially parallel relation with said free edge of said top section to provide a longitudinal opening between said top and front sections across said case between its open opposite ends and said overlapping portions of said covering material along said upper free edge extending outwardly thereof and being free to move with a hinge-like action relative to said edge.

References Cited in the file of this patent

UNITED STATES PATENTS 1,391,674    Duncanson _____ Sept. 27, 1921

FOREIGN PATENTS 420,114    Great Britain _____ Nov. 26, 1934